July 11, 1972     C. T. JACKSON     3,676,258

APPARATUS FOR PRODUCING FIBER GLASS ARTICLES

Original Filed Feb. 25, 1967     7 Sheets-Sheet 1

INVENTOR.
Carl Thomas Jackson
BY
J. H. Slough
ATTORNEY.

July 11, 1972   C. T. JACKSON   3,676,258
APPARATUS FOR PRODUCING FIBER GLASS ARTICLES
Original Filed Feb. 25, 1967   7 Sheets-Sheet 2
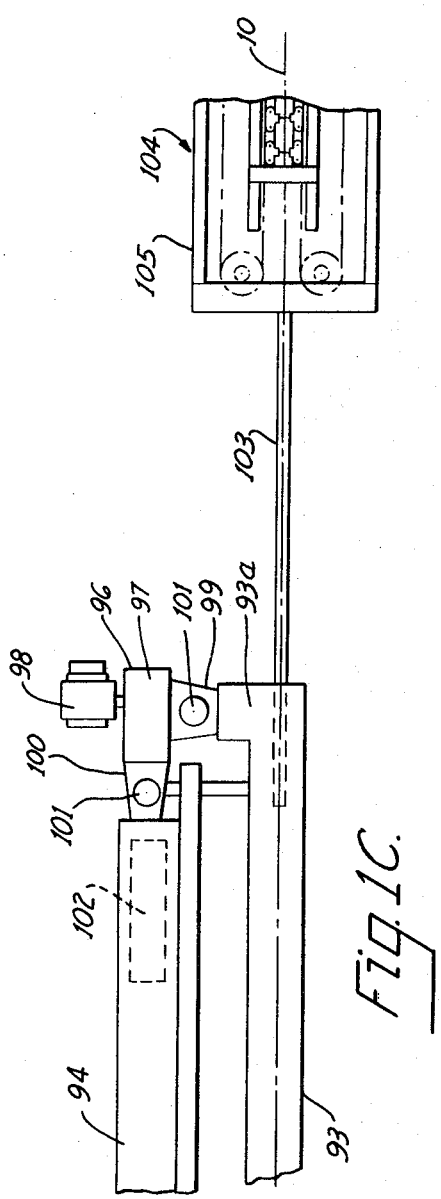
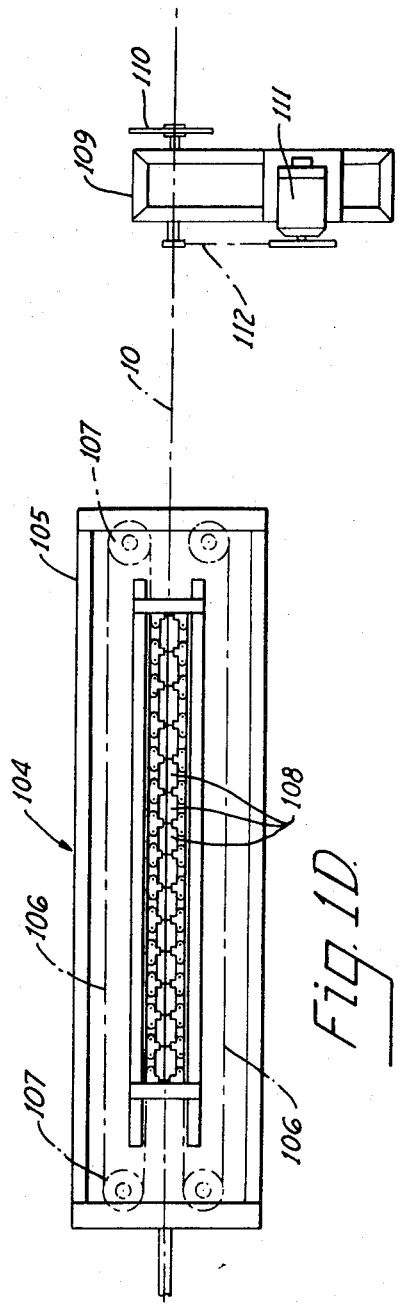
INVENTOR.
Carl Thomas Jackson
BY
J. H. Slough
ATTORNEY.

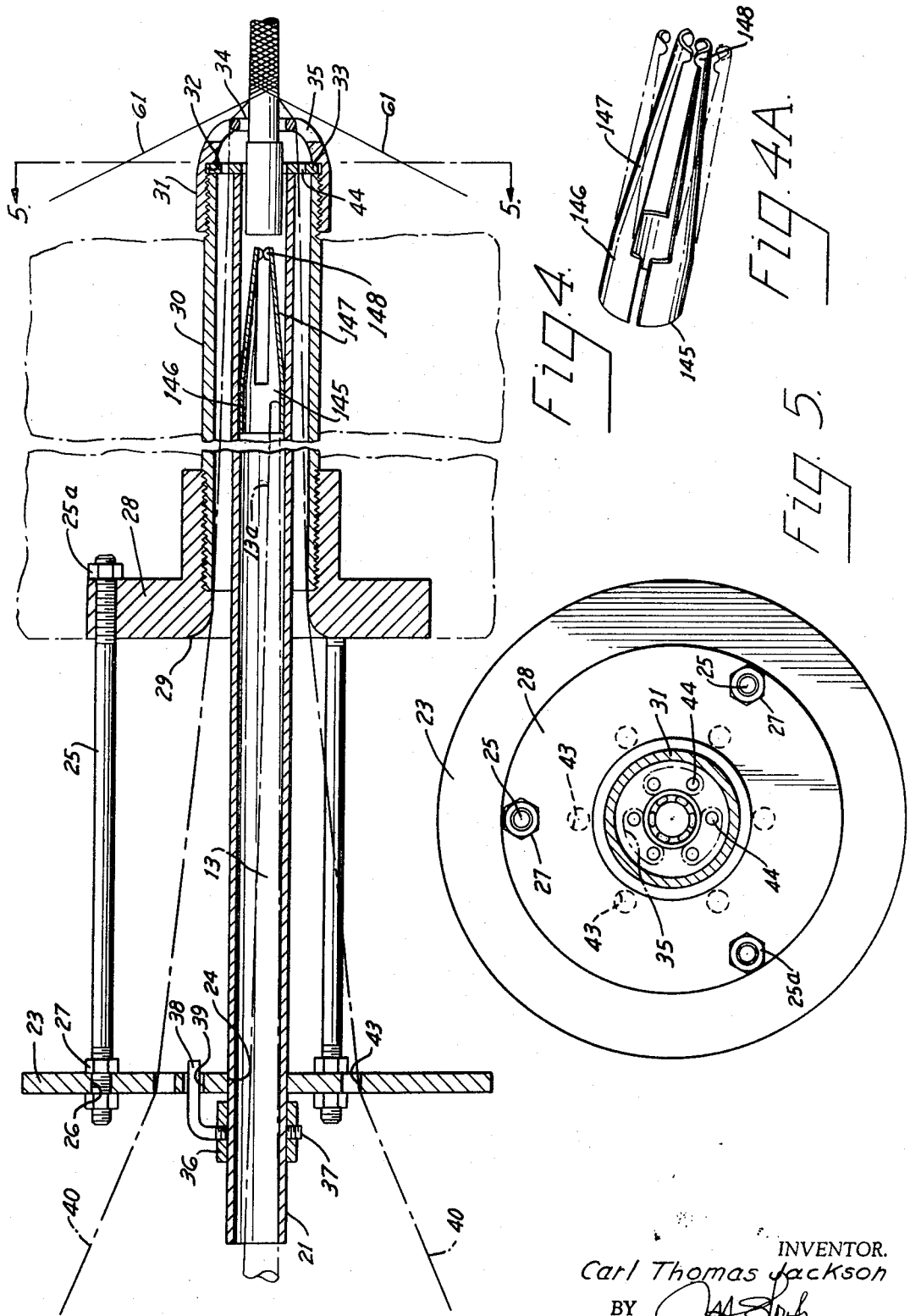

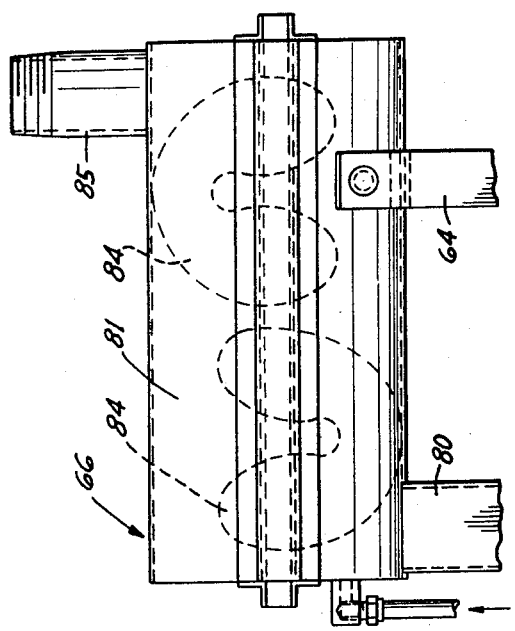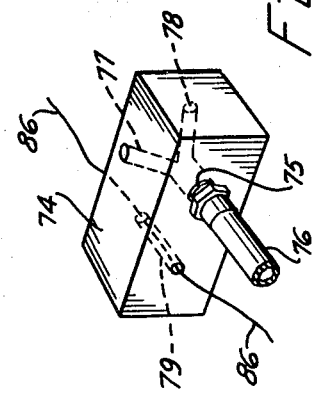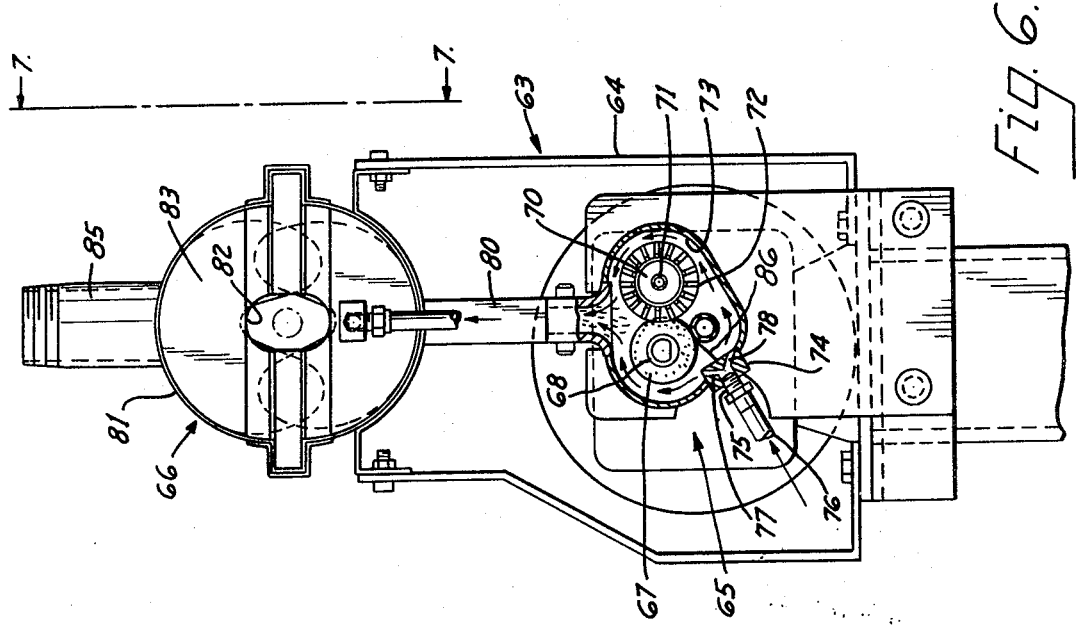

July 11, 1972   C. T. JACKSON   3,676,258
APPARATUS FOR PRODUCING FIBER GLASS ARTICLES
Original Filed Feb. 25, 1967   7 Sheets-Sheet 6
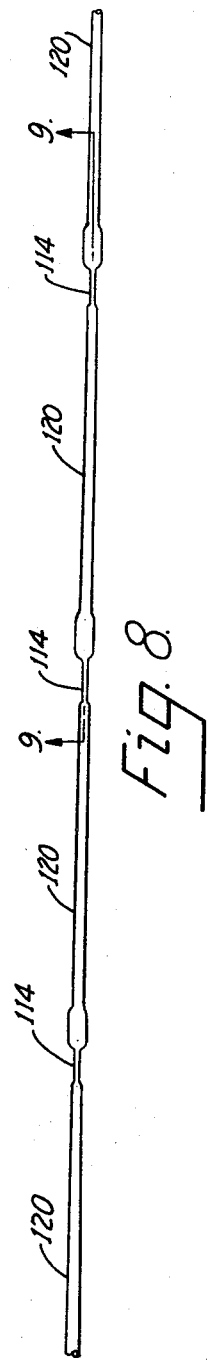
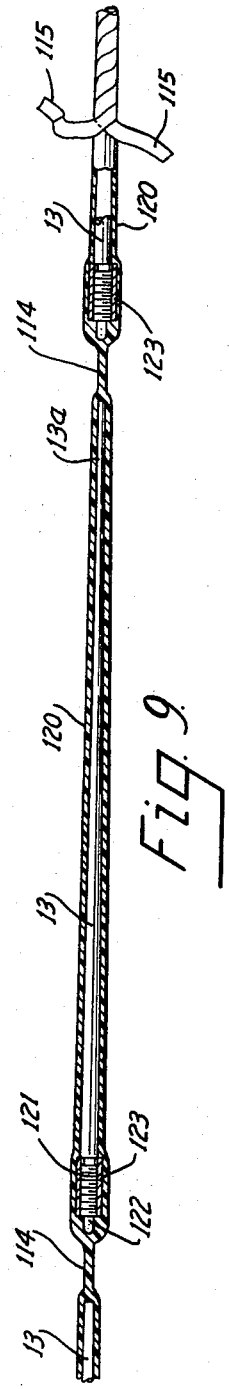
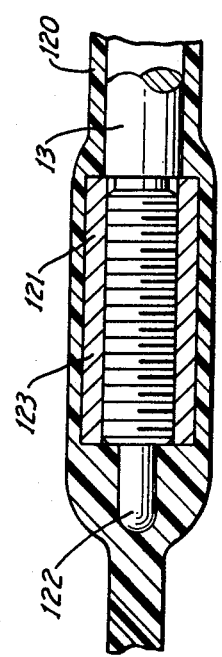
INVENTOR.
Carl Thomas Jackson
BY
J. H. Slough
ATTORNEY July 11, 1972   C. T. JACKSON   3,676,258
APPARATUS FOR PRODUCING FIBER GLASS ARTICLES
Original Filed Feb. 25, 1967   7 Sheets-Sheet 7
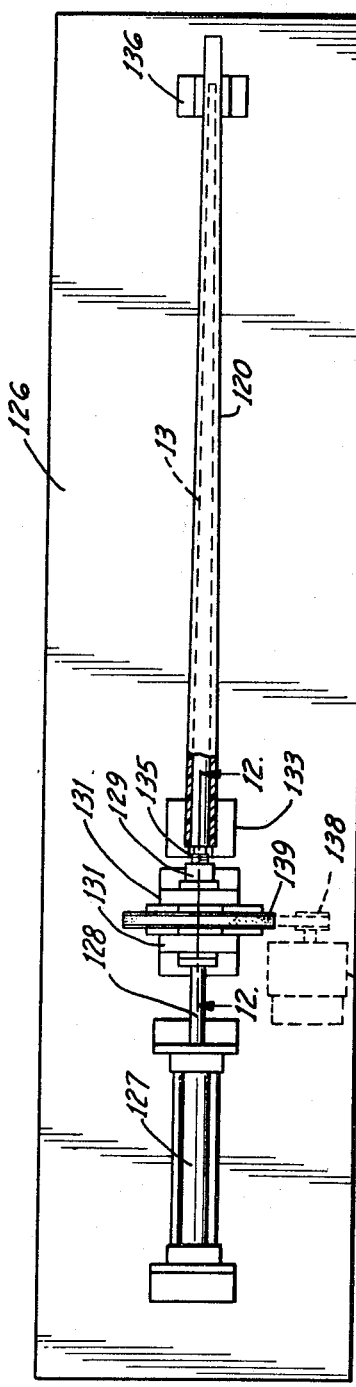
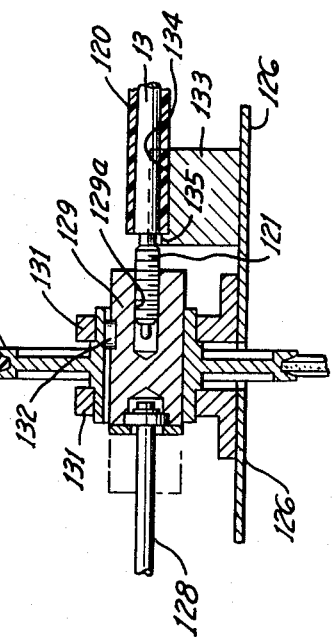
INVENTOR.
Carl Thomas Jackson
BY
J. H. SLOUGH
ATTORNEY.

United States Patent Office 3,676,258
Patented July 11, 1972

3,676,258
APPARATUS FOR PRODUCING FIBER GLASS ARTICLES
Carl Thomas Jackson, Fairview, Pa., assignor to True Temper Corporation, Cleveland, Ohio
Original application July 25, 1967, Ser. No. 655,919, now Patent No. 3,567,542. Divided and this application Feb. 20, 1970, Ser. No. 12,999
Int. Cl. B65h 81/08
U.S. Cl. 156—392        15 Claims

ABSTRACT OF THE DISCLOSURE

There is disclosed herein a method and apparatus for continuously producing fiber glass reinforced articles by continuously pulling a plurality of fiber glass strands along a production line, some of said strands being provided with an uncured resin, arranging the strands into a tubular shape, successively inserting mandrels into the tube thus formed, curing the resin, cutting the mandrels apart, and removing the mandrels from the hollow articles formed thereon.

---

This is a divisional of U.S. application Ser. No. 655,919, now U.S. Pat. 3,567,542, filed July 25, 1967.

This invention relates to an improved apparatus for the production of fiber glass reinforced articles, said apparatus being particularly adapted for producing hollow tubular articles such as plastic golf shafts.

An object of this invention is to provide such apparatus for producing a hollow, fiber glass reinforced, plastic golf shaft having physical characteristics relating to flexural and torsional strength which are superior to shafts now currently available.

Another object of this invention is to provide an apparatus whereby said golf shafts are produced on a continuous production line basis.

Still another object is to provide an apparatus as set forth above wherein reinforcing strands of fiber glass are pulled continuously along a production line with the plurality of mandrels being sequentially inserted within the group of filaments to produce a series of tubular articles in tandem arrangement.

A still further object of the invention is to provide an apparatus for alternately placing longitudinally disposed and helically wound fiber glass reinforcing strands upon mandrels sequentially fed into a continuous production line.

Yet another object of the invention is to provide such apparatus wherein short, chopped fiber glass filaments are placed in random orientation between and over certain of the layers of fiber glass.

Further objects of the invention and a number of the advantages thereof will be readily apparent from the following description of the invention and the accompanying drawings, in which said drawings:

FIGS. 1A, 1B, 1C, and 1D show in schematic form, sequential portions of the apparatus of this invention for producing golf shafts in assembly line fashion, the work progressing from left to right in each figure;

FIG. 4 is a longitudinal section through a braider mandrel taken generally along the line 4—4 of FIG. 1A;

FIG. 4A is a perspective view of a mandrel tip guide carried by the braider mandrel of FIG. 4;

FIG. 5 is a transverse section taken generally along the line 5—5 of FIG. 4;

FIG. 6 is a transverse section through a fiber glass shredding apparatus taken along the line 6—6 of FIG. 1B;

FIG. 6A is a perspective view of a distributor block of the shredding apparatus of FIG. 6;

FIG. 7 is a partial side elevation of the shredding apparatus as seen from the line 7—7 of FIG. 6;

FIG. 8 is a side elevation of a plurality of mandrels disposed in tandem relation and encased in fiber glass reinforced plastic, as said mandrels appear in the production line;

FIG. 9 is a horizontal section taken along the line 9—9 of FIG. 8 and along a centerline of a mandrel, only the mandrel remaining unsectioned;

FIG. 10 is an enlarged detail of one end portion of a mandrel as shown in FIG. 9;

FIG. 11 is a top plan view of a mandrel pulling apparatus for removing the mandrel from the finished shaft; and FIG. 12 is a section taken along the line 12—12 of FIG. 11.

Figure 1A:
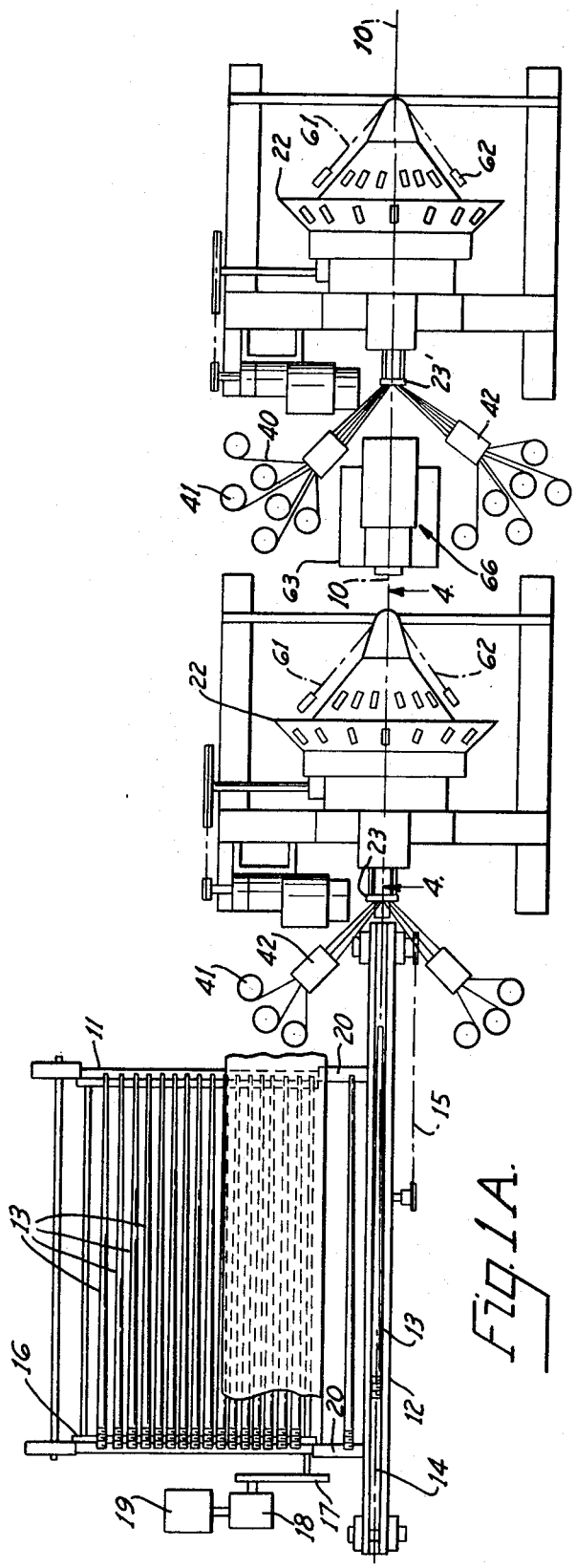
Figure 1B:
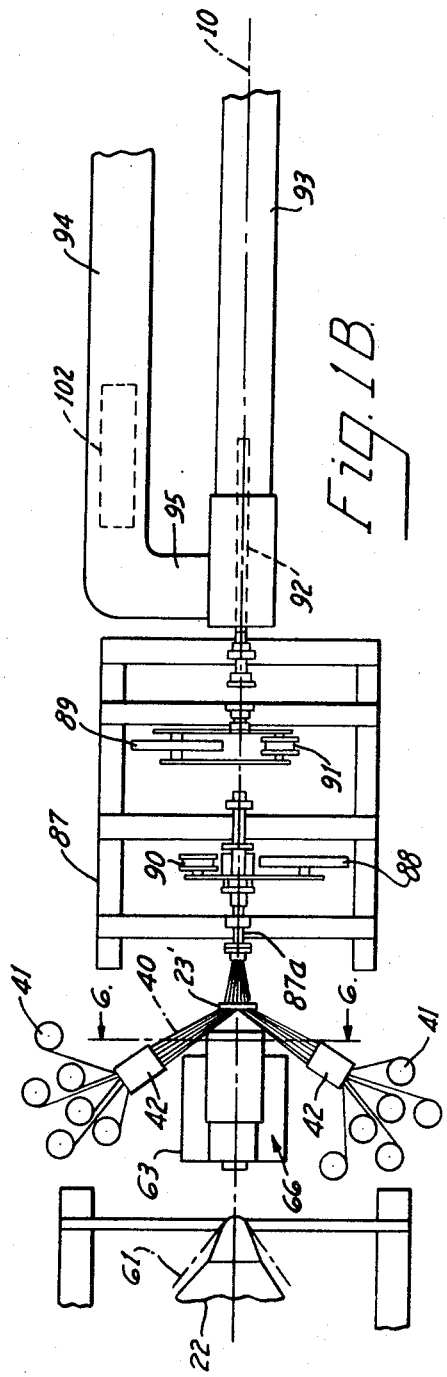

Referring now to the drawings in all of which like parts are designated by like reference numerals and particularly to the schematic FIGS. 1A, 1B, 1C, and 1D, the apparatus of this invention is arranged to provide a straight production line or path 10 indicated by a broken line extending through the center of the various components of said apparatus. Beginning with FIG. 1A and moving from left to right through the manufacturing process, a mandrel feeder 11 is disposed laterally of the production line 10 adjacent to a narrow mandrel conveyer 12 which said conveyer is disposed along said production line. The mandrel feeder 11 is adapted to hold a plurality of elongated, tapered mandrels 13 disposed laterally of and parallel with the production line 10. The mandrels are so shaped as to provide a tapered form upon which plastic golf shafts are progressively built up by applications of longitudinally disposed, resin impregnated, multifilament strands of fiber glass, braided dry strands of fiber glass, and short, chopped fiber glass filaments in random orientation. The conveyer 12 preferably comprises a continuously moving belt 14 driven through suitable chain and sprocket means 15 from a suitable power source (not herein shown). The mandrels 13 are conveyed toward the mandrel conveyer 12 by means of a feed conveyer 16 which is driven by chain and sprocket means 17. Said chain and sprocket means 17 is connected at one end to an intermittent drive unit 18 powered by a suitable motor 19. Said intermittent drive unit drives said feed conveyer 16 only at spaced time intervals whereby a mandrel 13 disposed upon the belt 14 is moved to the right beyond the mandrel feeder 11 before the next mandrel is moved onto said belt. With each feed motion of the feed conveyer 16, one mandrel is caused to drop downwardly along inclined ways 20 onto the belt 14.

The mandrels 13 are disposed with their smaller, tapered ends toward the right or in the direction of flow of the production line or path 10, and as each mandrel moves toward the right impelled by the mandrel conveyer 12, said mandrel enters a guide tube 21 disposed centrally of and associated with a first braiding machine or braider 22. Referring now particularly to FIG. 4, a vertically disposed distributor plate 23 having a central aperture 24 is telescoped over the guide tube 21 and is maintained in a fixed, spaced relation with respect to the rearward end of the braider 22 by a plurality of spacer rods 25. The spacer rods 25 are threaded at the end portions thereof, their rearwardly directed ends being disposed through apertures 26 in the distributor plate 23 and said rods being secured to said distributor plate by pairs of adjusting nuts 27. The forward ends of said spacer rods 25 are thread fitted into a radiating flange 28 of a fitting member 29 which is part of the braider 22. Lock nuts 25a are provided at the forward ends of said spacer rods to secure the same in said flange 28.

The fitting member 29 is internally threaded whereby it is adapted to receive the externally threaded, rearend portion of a sleeve 30 which surrounds and is spaced radially outwardly from the guide tube 21. The forwardly directed end of the sleeve 30 is also externally threaded to receive an end cap 31 having an annular, internal seat 32 adapted to receive a small distributor plate 33. The end cap 31 projects forwardly beyond the small distributor plate 33 and is provided with a central aperture 34 surrounded by a plurality of arcuate openings 35. Rearwardly of the relatively larger distributor plate 23, the guide tube 21 is provided with a collar 36 having a set screw 37 for securing it tightly to said guide tube. Said collar also carries an angle-shaped key member 38 which projects through an opening 39 in the distributor plate 23 to prevent rotation of the guide tube 21.

A mandrel tip guide 145, shown in detail in FIG. 4A, is disposed within the guide tube 21 adjacent to the smaller distributor plate 33. The tip guide 145 guides the forward, tapered tip 13a of each mandrel upwardly to the axis of the guide tube 21 thereby assuring that said mandrel tip will pass centrally through the central aperture 34 of the end cap 31. Said tip guide 145 comprises a piece of resilient sheet metal or the like rolled to provide a tubular body portion 146 and cut and formed to provide diametrically opposed, transversely arcuate, forwardly tapering and converging jaws or fingers 147 having inwardly turned tabs 148 at the forward ends thereof. The tabs 148 of each finger 147 are generally semicircular in transverse shape whereby a generally circular, relatively small opening is provided at the forward end of said tip guide. The tip guide 145 is secured within the guide tube 21 in any suitable manner, the tip 13a of each mandrel entering the body portion 146 and being guided upwardly to the center of said guide tube by the resilient fingers 147. Said fingers open as the larger portions of each mandrel pass therethrough (see broken lines position of FIG. 4A) but resiliently maintain said mandrel in such elevated position that it passes through the center of the aperture 34 when leaving the guide tube 21.

In the form of the invention herein described and illustrated, multifilament strands 40 of fiber glass extend from spools 41 through wet-out tanks 42 and through distributing apertures 43 in the distributor plate 23. Said distributing apertures at the first braider 22 are six in number and are circumferentially evenly spaced concentrically around the guide tube 21, each said distributing aperture having a single strand 40 threaded therethrough whereby six of said strands coming from six spools 41 are uniformly distributed about the axis of the guide tube 21 through which each mandrel passes. The strands 40 then extend forwardly between the guide tube 21 and the sleeve 30, each said strand 40 passing through a distributing aperture 44 of the smaller distributor plate 33. The apertures 44 are also circumferentially evenly spaced concentrically around the guide tube 21, and the strands 40 extend forwardly therefrom through one of the arcuate openings 35.

Figure 2:
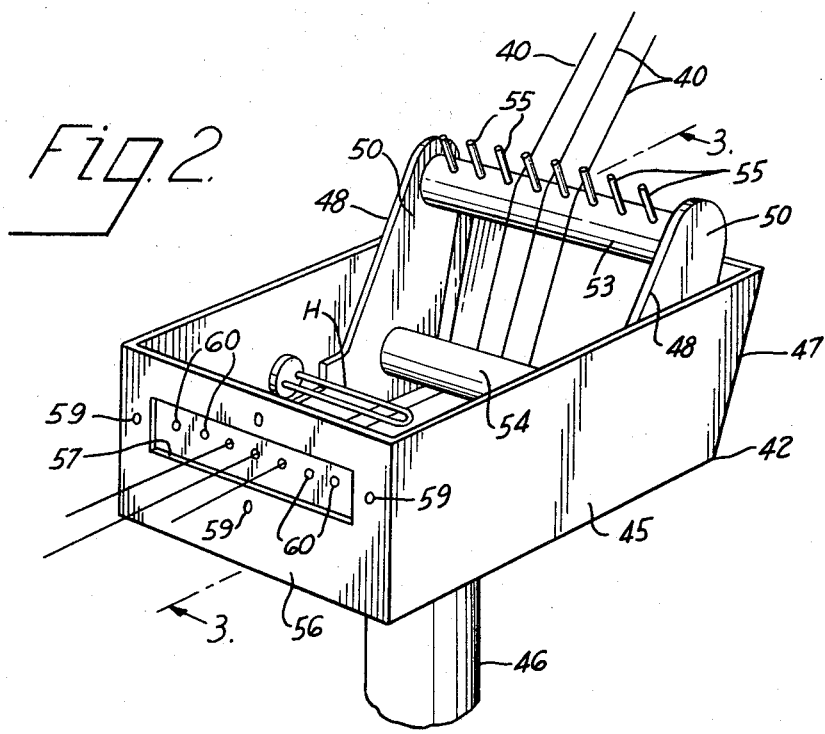
FIG. 2 is a perspective view of a wet-out tank for impregnating fiber glass strands with a thermosetting resin.
Figure 3:
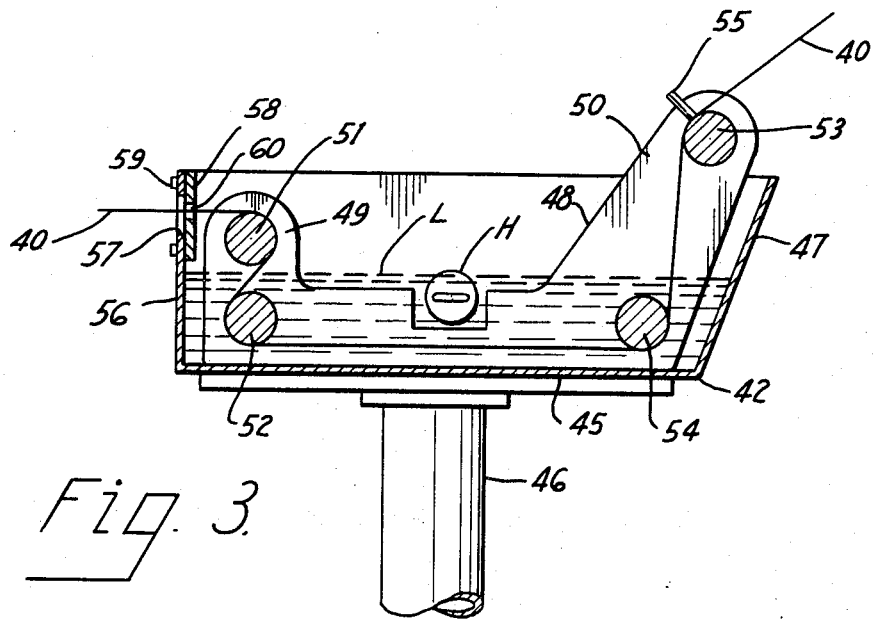
FIG. 3 is a longitudinal section through the wet-out tank of FIG. 2 taken generally along the line 3—3 of FIG. 2.

The spools 41 may be mounted in any suitable manner to allow the strands 40 to be unwound therefrom for movement into and through a wet-out tank 42 shown in detail in FIGS. 2 and 3. Each said wet-out tank comprises a generally rectangular, open top container 45 mounted in any suitable manner such as upon a support shown at 46. As herein illustrated, the container 45 has an outwardly tilted, rear wall 47 and a pair of laterally spaced side frame members 48 which are disposed closely adjacent to the lateral sides of said container. Each side frame member has an upwardly projecting arm portion 49 at the forward end thereof and an upwardly and backwardly tilted arm 50 at the rearwardly directed end thereof. The side frame members 48 are connected at the front arms 49 by a pair of vertically spaced, preferably round, upper and lower, guide bars 51 and 52, respectively, and at the rearward arms 50 by upper and lower guide bars 53 and 54, respectively. The rearwardly tilted arms 50 are substantially longer than the arms 49 thereby disposing the upper guide bar 53 upwardly above the edge of the container 45.

The guide bar 53 is preferably provided with a plurality of radially directed guide pins 55 spaced from each other and disposed in a straight line along said guide bar parallel with the axis thereof. Said guide pins 55 are preferably tilted slightly in a forward direction and are adapted to separate individual strands 40 which enter the wet-out tank from the rear thereof. Each strand 40 passes between a pair of adjacent guide pins 55, downwardly under the lower rear guide bar 54, forwardly and under the lower forward guide bar 52, and then rearwardly and upwardly around the forward upper guide bar 51. A front wall 56 of the container 45 is provided with a rectangular opening 57 covered by a removable plate 58 disposed on the inside of said front wall. The plate 58 may be detachably secured in any suitable manner; such as, by small screws 59, said plate being provided with a row of uniformly spaced metering apertures 60 disposed in a horizontal line across the front wall 56. The apertures 60 correspond in number to the spaces between the guide pins 55, each said aperture being adapted to have threaded therethrough one of the strands 40 of fiber glass. In the instant case, three said strands would be provided at each wet-out tank 42, two tanks being provided to accommodate the six spools 41. Obviously, the wet-out tanks could be made to accommodate any number of strands 40.

The container 45 holds a thermosetting resin such as an epoxy in its uncured liquid state, the upper level of said liquid being disposed above the level of the guide bars 52 and 54 and below the level of the guide bar 51. It will be readily appreciated from the foregoing that each strand 40 which is dry when it leaves a spool 41, passes downwardly over a guide bar 53 between a pair of guide pins 55, enters the liquid, uncured resin and passes therethrough beneath guide bars 54 and 52, and then passes upwardly out of the liquid and around a guide bar 51, whereby it is thoroughly impregnated and saturated with the resin prior to passing outwardly through one of the apertures 60. A small resistance heater shown at H preferably projects into the liquid resin from one wall of the container 45 for maintaining said resin at a desired, predetermined viscosity. The viscosity of said liquid in combination with the number and positioning of the guide bars 51–54 and the size of the apertures 60 can be varied and utilized to effect a predetermined resistance to the movement of the strands 40 thereby affording to each strand a predetermined amount of tension. The tension thus afforded causes the strands to be pressed firmly against the upper front guide bar 51 after passing out of the liquid resin which said pressure tends to remove a certain amount of resin from the strands. The size of the openings or apertures 60 can be varied depending upon the size of the strands for removing excess amounts of resin from the strand and causing it to drop back into the container 45.

As the thoroughly wetted strands 40 pass out of the forwardly directed end of the braider 22, said strands are wrapped by strands 61 fed from spools 62 of said braider. Said braider is of a well-known type which is adapted to oppositely helically wind and braid the strands 61 about the longitudinal group of strands 40. This braiding takes place just beyond the end of the end cap 31, the spools 62 being provided with known tensioning means whereby the helical strands 61 are firmly wound around the longitudinal strands 40.

It will be readily seen that a mandrel 13 moving through the guide tube 21 and outwardly through the central aperture 34 of the end cap 31 is encased first by inner, longitudinally disposed strands 40, spaced evenly around its outer circumference, and then by outer, helically wound strands 61. The strands 61 are dry when applied to the mandrel but quickly become impregnated with liquid resin from the now thoroughly wetted longitudinal strands 40. The pressure engagement between the helical strands 61 and the longitudinal strands 40 causes the resin to distribute itself evenly through all of the strands thereby effectively wetting the braiding strands. Means are provided (which will herein later be discussed in detail) for maintaining a constant pulling pressure on all of the strands whereby each mandrel is pulled outwardly through the end cap 31 to be progressively sheathed in the longitudinal and braided fiber glass strands.

After a mandrel 13 leaves the first braider 22, it passes through a first shredding apparatus adapted for both chopping fiber glass filaments into short lengths and applying the same evenly over the mandrel. Said shredding apparatus is shown schematically to the right of the first braider 22 in the production line 10 and is illustrated in detail in FIGS. 6, 6A and 7. The shredding apparatus 63 comprises a frame 64 having a shredder 65 mounted adjacent to the lower portion thereof and a hollow accumulator 66 mounted adjacent to the upper portion thereof. The shredder 65 comprises a resilient roller 67 mounted upon a drive shaft 68 driven in any suitable manner by a motor 69. Closely adjacent to the roller 67 there is provided a wheel 70 mounted for rotation upon a shaft 71 and carrying radially outwardly projecting blades 72, the outer circumferential path of said blades overlapping the periphery of the roller 67 whereby said blades frictionally engage and press into the resilient surface of the roller to cause rotation of the wheel 70 when said roller is rotated. The roller 67 and the wheel 70 are encased in a housing 73 having a distributor block 74 mounted therein generally below and toward the left of the roller 67. The block 74 is tapped to receive a fitting 75 of an air hose 76 and board to provide diverging Y-shaped air passages 77 and 78 which open into the housing 73. Laterally of the Y-passages 77 and 78, the block 74 is provided with small through bore 79 just large enough to slidably receive a multifilament strand of fiber glass material.

A pipe or duct 80 extends upwardly from the housing 73 into the bottom of the accumulator 66. Said accumulator comprises an enlarged hollow housing 81 having vertically elongated, aligned openings 82 in the end walls 83 thereof through which the mandrels 13 pass along the production line 10. The housing 81 contains a pair of U-shaped baffles 84 and is surmounted by an exhaust pipe 85.

In operation of the shredding apparatus 63, the roller 67 is rotated in a counterclockwise direction as seen in FIG. 6 thereby causing clockwise rotation of the wheel 70. A strand 86 of fiber glass which is threaded through the through bore 79 is projected between the rotating roller and wheel whereby it is cut or chopped into short lengths by the rotating blades 72. Pressurized air introduced through the air hose 76 is expelled in two directions and caused to swirl around the inner walls of the housing 73 as indicated by the arrows. The air then passes upwardly through the pipe or duct 80 into the accumulator 66, the shredded fiber glass filaments becoming entrained in said flowing air. The pressurized air enters the housing 81 and is caused to swirl around within the accumulator by the baffles 84 thereby creating an agitated atmosphere having short filaments entrained therein moving in many directions. As each mandrel 13 passes through the housing 81 by means of the openings 82 therein, the swirling fiber glass filaments are deposited upon the moist surface of the resin rich fiber glass windings which have been placed upon said mandrel. The short filaments are oriented at random upon the mandrel thereby providing stress resistant reinforcement to the developing golf shaft in many different directions.

After leaving the first shredding apparatus 63, each mandrel is again provided with a layer of longitudinal strands 40 overlaid by braided strands 61. As herein illustrated, the second set of spools 41 is twelve in number, the strands 40 thereof passing through wet-out tanks 42 in the same manner as previously described. A rearmost distributor plate 23' carried by the second braider is identical in form and construction with the distributor plate 23 of the first braider with the exception that it is provided with twelve rather than six circumferentially evenly spaced openings or apertures for receiving the twelve wet strands 40. The second layer of longitudinal strands is placed over the shredded or chopped fibers provided by the first shredding apparatus 63, said second layer of longitudinal fibers being then covered by helically wound and braided strands 61 of a second braider 22, which is identical with the first braider. The strands 61, as hereinbefore described, are initially dry but become permeated with the uncured resin from the longitudinal fibers beneath them.

Upon leaving the second or most right-hand braider of FIG. 1A, each mandrel 13 passes through a second shredding apparatus 63 which is identical with the first shredding apparatus hereinabove described and applies a layer of random oriented, short fiber glass filaments upon said mandrel.

After leaving the second shredding apparatus 63, the mandrels 13 are provided with an additional outer, finishing layer of longitudinal strands 40 fed from additional spools 41 and passed through additional wet-out tanks 42. A second guide plate 23' or the like is provided, rearwardly of a wrapping device 87, for distributing the longitudinal strands about the circumference or each mandrel 13, said strands being directed therefrom through a guide tube 87a. Each mandrel then proceeds to the guide tube 87a of the wrapping device 87 which said device is provided with counterrotating rolls 88 and 89 of a suitable nonporous tape, said rolls having associated therewith tension rollers 90 and 91, respectively. The wrapping device 87 puts two oppositely helically wound layers of tape around the mandrel in a manner well known in the art, said tape being of a familiar type, such as cellophane which will not adhere to or become bonded to the resin. A guide tube 92 then directs each mandrel into a heating tunnel 93 shown at the right-hand end of FIG. 1B and completed at the left-hand of FIG. 1C. The heating tunnel 93 is straight and is disposed along the production line 10, a laterally disposed and parallel duct 94 being connected thereto at the ends thereof by a short duct 95 (FIG. 1B) and a blower means 96 (FIG. 1C). Said blower means comprises a fan 97 adapted to be rotated by a suitable motor 98, said fan being connected to the heating tunnel 93 by a short pipe 99 and an elbow 93a of said heating tunnel, and to the parallel duct 94 by a short pipe 100. The pipes 99 and 100 are preferably provided with suitable dampers as symbolically indicated at 101.

In operation, the fan 97 driven by the motor 98 causes air to circulate in a closed path through the small pipe 100, duct 94, short duct 95, heating tunnel 93, elbow 93a, pipe 99, back to said fan 97. Heating means such as resistance heaters 102 (FIGS. 1B and 1C) are provided in the parallel duct 94 whereby the recirculated air is continuously heated and then forced through the heating tunnel 93. Said heating tunnel is preferably forty to sixty feet in length, and the rate of movement of the mandrels through such tunnels is such that the resin in the newly formed golf shafts is cured during the passage therethrough.

At the exit end of the heating tunnel 93 (FIG. 1C) a guide tube 103 directs the mandrels into a draw bench 104 (FIGS. 1C and 1D). Said draw bench comprises a frame 105 carrying a pair of endless sprocket chains 106 mounted on either side of the production line or path 10 by pairs of sprockets 107 mounted on vertical axes at either end of said draw bench. The sprocket chains 106 are mounted lengthwise of the frame 105 and parallel with each other and are provided with outwardly projecting resilient shoes 108 the outer surfaces of which abut at those parts of the chains moving along the production line 10. The mandrels 13 pass in succession through the guide tube 103 between the shoes 108 where they are resiliently gripped and the entire production line of mandrels moved along the line 10 toward the right as shown in FIG. 1D. The draw bench 104 provides the pulling force which keeps the entire line of mandrels moving, it being understood that the two sprockets at the right-hand or exit end of said draw bench are driven by suitable power means (not herein illustrated) which causes said right-hand sprockets to rotate synchronously in opposite directions.

The line of mandrels 13 is then directed to a cutoff saw mechanism 109 having a rotary blade 110 driven by a motor 111 through suitable chain and sprocket means 112. At this point, the mandrels 13 with the fiber glass reinforced shafts formed and cured thereon are separated by cutting transversely between adjacent mandrels at the narrow portion indicated at 114 in FIG. 9. The cellophane tape, indicated at 115, may then be removed from the shaft, its purpose being only to maintain the fiber glass reinforced resin in its proper form while the curing process takes place.

As shown in FIGS. 9 and 10, each mandrel 13 is elongated and provided with a constant taper toward the tip end 13a thereof for defining the inner shape of the shaft formed thereon, said shaft being indicated at 120. The larger end of each said mandrel is provided with an externally threaded portion 121 having a longitudinally projecting, bullet-shaped portion 122. Prior to forming the golf shaft 120 upon the mandrel 13, an expendable cardboard sleeve 123 is disposed over and completely encompasses the threaded portion 121. Said sleeve 123 protects the threaded portion 121 and prevents the thread thereof from being filled with the liquid resin. The bullet-shaped portion 122 is provided to reduce the abrupt transition between the larger end of the mandrel 13 and the narrow portion 114 disposed between adjacent mandrels and comprising only the fiber glass reinforced resin. Reducing the abruptness of transition at this point facilitates the cellophane wrapping process and prevents breakage of the tape 115.

Referring now to FIGS. 11 and 12, after a mandrel 13 and its associated, newly formed hollow shaft 120 have been severed from adjacent mandrels at the narrow portions 114, the individual mandrels are conveyed by any suitable means to a mandrel puller 125. Said mandrel puller comprises a bench or frame 126 having a cylinder and piston motor 127 mounted at one end generally along the centerline thereof. Said cylinder and piston motor has an outwardly extending piston rod 128 carrying a freely rotatable head 129 which is internally threaded at 129a to receive the externally threaded portion 121 of a mandrel 13. A pulley 130 mounted in stationary journal means 131 slidably receives the head 129 which is keyed to rotate with said pulley by means of a key 132. A stationary pull block 133 having a semicircular recess 134 therein for seating the larger end of the mandrel 13 and shaft 120 is provided on the side of the pulley 130 opposite to the cylinder and piston motor 127. Said pull block 133 has a radially inwardly directed flange or step 135 of lesser diameter than the outer diameter of the shaft 120 but large enough to allow the threaded portion 121 to project therethrough in the direction of said pulley 130. A longitudinally spaced guide block 136 receives the opposite or tapered end of the shaft and mandrel whereby it holds said shaft and mandrel in alignment with the axis of the piston rod 128 and head 129. The pulley 130 is adapted to be driven by a reversible motor 137 by any suitable means such as a pulley 138 and belt 139. The bench or frame 126 also carries, at one side thereof, a chucking machine 140 of the type which is standard and well known in woodworking plants.

After a mandrel 13 is cut out of the production line, the large end of the said mandrel is inserted into the chucking machine 140 whereby the fiber glass reinforced resin surrounding the threaded portion 121 and the bullet-shaped extension 122 is ground or chewed away. The cardboard sleeve 123 acts as a safety covering to prevent the chucking machine from damaging the threaded portion 121 and is also removed. The mandrel is then placed in the pull block 133 with the larger end of the shaft 120 abutting the flange or step 135 thereof. The cylinder and piston motor 127 is actuated to push the head 129 toward the right as shown in FIG. 11, said head being rotated by the pulley 130 in such direction as to cause it to engage the threaded portion 121. Said cylinder and piston motor is then reversed to strip the shaft 120 from the mandrel 13 after which the direction of rotation of the pulley 130 is reversed to unscrew the head 129 from the threaded portion 121. The mandrel 13 can then be easily removed from the shaft 120. The narrow linking portion 114 is removed from the smaller tapered end of the shaft 120 which said shaft is now ready for further processing in the manufacture of golf clubs.

In initially setting up the production line hereinabove described, all of the strands 40 and 61 of fiber glass are first pulled from their source at the spools 41 and braiders 22 along the full length of the production line to and including the draw bench 104. All of the power for moving said strands and the mandrels 13 along the production line 10 is provided by said draw bench, and the individual mandrels are pulled along by the fiber glass strands laid and braided thereupon. The speed of the production line can be varied by varying the speed of the draw bench, and the speed of the draw bench in relation to the speed of the braiders 22 can be varied to control the amount of braiding placed upon each shaft. Sufficient tension should be provided on the longitudinal fibers to cause them to be distributed evenly about the circumference of the mandrel and to prevent them from twisting about said mandrel. Before being fed into the production line, each mandrel is waxed or otherwise suitably treated to prevent the resin of the golf shaft from becoming bonded thereto. The resin used is preferably an epoxy although other resins, such as a polyester may be used.

In use and practice of the above described apparatus and method, preimpregnated fiber glass strands may be substituted for the initially dry, longitudinal strands 40. Such preimpregnated fiber glass is commercially available and well known to those familiar with the art, the strands thereof being impregnated with a suitable resin and provided to the user in spool form. If preimpregnated fiber glass is used, the wet-out tanks 42 are eliminated, the preimpregnated resin preferably having sufficient tack to cause the braiding strands to adhere to the longitudinal strands. The preimpregnated resin may or may not permeate the braiding before reaching the heating tunnel 93, and it has been found that the chopped fiber glass filaments will adhere to the braiding even when the braiding is dry. The amount of chopped filaments applied to the braiding is, therefore, controlled by the amount supplied to the accumulators 66 in relation to the wetness or tackiness of the braiding, more filaments being needed for dry braiding than for wet braiding to achieve the same filament concentration. The preimpregnated resin becomes completely liquid within the heating tunnel 93 prior to complete curing of the resin whereby all of the strands and chopped filaments are thoroughly impregnated with the resin before it hardens.

In the appended claims it will be understood that reference to fiber glass strands as being "impregnated" or "permeated" with resin or the like applies to both the wetting of initially dry strands and the use of preimpregnated fiber glass, unless the claim indicates otherwise.

It will be understood that many changes in the details of the invention herein described and illustrated may be made without, however, departing from the spirit thereof or the scope of the appended claims.

What is claimed is:

1. Apparatus for manufacturing fiber glass reinforced plastic tubular articles comprising means for pulling a plurality of fiber glass strands longitudinally along a production line and maintaining longitudinal pressure thereon, said strands being impregnated with a thermosetting resin; guide means disposed in said line and directing said impregnated strands into a tubular shape; means for projecting an elongated mandrel into the tube defined by said impregnated strands, said mandrel being pulled along said production line by said tube and said tube providing a first layer of strands upon said mandrel; means winding a second layer of fiber glass strands over said first layer, said mandrel being encased by all of said strands and carried along said production line by said strands and heating means, said production line passing through said heating means to cure said resin.

2. In apparatus as set forth in claim 1; means for individually depositing chopped fiber glass filaments in random orientation to the surface of said second layer prior to said mandrel entering said heating tunnel.

3. In apparatus as set forth in claim 2; said means for applying chopped fiber glass filaments comprising a hollow housing having openings at the ends thereof aligned with said production line whereby said mandrels pass therethrough; means for chopping said filaments; means for blowing said chopped filaments into said housing and agitating the atmosphere therein to keep said filaments entrained during the passage of said mandrel through said housing whereby said chopped filaments are individually deposited in random orientation upon the surface of said second layer.

4. Apparatus for manufacturing fiber glass reinforced plastic tubular articles comprising means for pulling a plurality of fiber glass strands longitudinally along a production line, said strands being impregnated with a thermosetting resin; guide means disposed in said line and directing said impregnated strands into a tubular shape; means for projecting an elongated mandrel into the tube defined by said impregnated strands, said tube providing a first layer of strands upon said mandrel; means winding a second layer of fiber glass strands over said first layer, said mandrel being encased by all of said strands and carried along said production line by said strands and heating means, said production line passing through said heating means to cure said resin; means for projecting mandrels sequentially into said tube, said means comprising a continuously moving conveyor and means for sequentially depositing a plurality of mandrels on said conveyor whereby said mandrels are moved endways into the tube defined by said strands, each mandrel being integrally linked to an adjacent mandrel by said strands and pulled along said production line.

5. In apparatus as set forth in claim 4; means for cutting said mandrels apart at the portions of said strands where they are linked together after said mandrels emerge from said heating means.

6. In apparatus as set forth in claim 5; means for removing said mandrels from the articles formed thereon to provide fiber glass reinforced plastic tubular articles.

7. Apparatus for manufacturing fiber glass reinforced plastic tubular articles comprising means for pulling a plurality of fiber glass strands longitudinaly along a production line, said strands being impregnated with a thermosetting resin; guide means disposed in said line and directing said impregnated strands into a tubular shape; means for projecting mandrels sequentially into said tube, said means comprising a continuously moving conveyor and means for sequentially depositing a plurality of mandrels on said conveyor whereby said mandrels are moved endwise into the tube defined by said strands, each mandrel being integrally linked to an adjacent mandrel by said strands and pulled along said production line, said tube providing a first layer of strands upon said mandrel; means winding a second layer of fiber glass strands over said first layer; heating means, said production line passing through said heating means to cure said resin; means for cutting said mandrels apart at the portions of said strands where they are linked together after said mandrels emerge from said heating means; means for removing said mandrels from the articles formed thereon to provide fiber glass reinforced tubular articles; said means for removing said mandrels comprising an externally threaded end portion carried by one end of each said mandrel; means for removing fiber glass reinforced plastic from said end portion; power means having an extendible and retractable member; a rotatable, internally threaded head carried by the distal end of said member; means for rotating said head in either direction about its axis; means for positioning each said mandrel in alignment with said head and said member and retaining the plastic tubular article formed on the mandrel against longitudinal movement toward said head whereby said member can be extended and said head rotated in one direction to engage said end portion of a mandrel, after which said member is retracted to remove said mandrel from said article and said head is rotated in the opposite direction to release said mandrel.

8. An apparatus as set forth in claim 7; an expendable sleeve being disposed on each said end portion before the associated mandrel is moved into said tube of strands whereby said plastic can be ground from said end portion without damaging the threads thereof.

9. Apparatus for manufacturing fiber glass reinforced plastic tubular articles comprising means for pulling a plurality of fiber glass strands along a path; wetting means wetting at least some of said strands with a thermosetting resin in a liquid state; means guiding and arranging the wetted strands in a uniform manner whereby said strands define a tube; means inserting at least one elongated mandrel into the tube of strands whereby the mandrel is carried along said path by said strands; means individually depositing chopped fiber glass filaments in random orientation and forming a layer of said filaments over at least some of said strands while said resin is in said liquid state; and heating means disposed in said path and providing a curing atmosphere through which said strands and mandrel pass to harden said resin.

10. In apparatus as set forth in claim 9; means providing a first layer of fiber glass strands disposed longitudinally parallel with said path and pulled along said path; means winding a second layer of fiber glass strands around said first layer as said first layer moves along said path; and said means depositing chopped fiber glass filaments in random orientation being adapted to deposit said chopped filaments on one of said layers.

11. Apparatus for manufacturing fiber glass reinforced tubular articles comprising an elongated mandrel having a threaded end portion; an expendable sleeve disposed over said end portion and covering the threads, means for encasing said mandrel in fiber glass reinforced plastic for forming an article thereon; means for removing said plastic from said end portion to the depth of said expendable sleeve for exposing the threads of said end portion; power means having an extendible and retractable member; a rotatable, internally threaded head carried by the distal end of said member; means for rotating said head in either direction about its axis; means for positioning said mandrel in alignment with said head and said member and retaining the article against longitudinal movement toward said head whereby said member can be extended and said head rotated in one direction to engage said end portion after which said member is retracted to remove said mandrel from the article and said head is rotated in the opposite direction to release said mandrel.

12. Apparatus for manufacturing fiber glass reinforced tubular articles comprising means for encasing an elongated mandrel in a tube of fiber glass strands, at least some of said strands being impregnated with a thermosetting resin; means for pulling said tube of strands along a path, the mandrel being pulled along said path by said tube; means for applying chopped fiber glass filaments to the said strands comprising a hollow housing having openings at the ends thereof whereby said mandrel passes therethrough; means for chopping said filaments; means for blowing said chopped filaments into said housing and agitating the atmosphere therein to keep said filaments entrained during the passage of said mandrel through said housing whereby said chopped filaments are deposited in random orientation upon said tube of strands around said mandrel.

13. Apparatus as set forth in claim 12; baffle means disposed within said housing and causing said atmosphere to swirl and be agitated within said housing.

14. In apparatus for manufacturing fiber glass reinforced tubular articles, means for pulling a plurality of fiber glass strands under tension along a path, at least some of said strands being permeated with a thermosetting resin in an uncured state; means guiding and arranging said strands whereby said strands converge forwardly in the direction of movement along said path and continuously form a tube adapted to receive elongated, tapered mandrels successively inserted therein and carried along said path by said strands; a mandrel guide member disposed in alignment with the continuously forming tube of strands, said guide member having its exit end disposed forwardly adjacent to the point of convergence of said strands; a mandrel tip guide carried by said guide member; said tip guide comprising an open ended, hollow body portion having resilient fingers converging forwardly whereby a mandrel inserted into said guide member with its tapered tip end portion disposed forwardly enters said hollow body portion and has the tip end portion thereof guided upwardly to the centerline of said tube for insertion coaxially into said tube, said resilient fingers spreading apart to allow the larger portion of said mandrel to pass therethrough.

15. In apparatus as set forth in claim 14; said guide member comprising an open ended, cylindrical tube; said body portion of said tip guide being generally cylindrical and fitted within said cylindrical tube; said tip guide being formed of flexible sheet material, said fingers being integral with said body portion and arcuately curved transversely.

References Cited

UNITED STATES PATENTS

| | | | |
|---|---|---|---|
| 3,408,241 | 10/1968 | Keyt et al. | 156—441 X |
| 3,436,442 | 4/1969 | Saks | 156—279 X |
| 2,714,414 | 8/1955 | Ganahl et al. | 156—432 X |
| 2,789,075 | 4/1957 | Stahl | 156—279 X |
| 3,259,533 | 7/1966 | Philipson | 156—392 X |
| 3,033,729 | 5/1962 | Shobert | 156—175 UX |

BENJAMIN A. BORCHELT, Primary Examiner

G. E. MONTONE, Assistant Examiner

U.S. Cl. X.R.

156—175, 279, 432, 441